(12) United States Patent
Okamoto et al.

(10) Patent No.: US 12,533,984 B2
(45) Date of Patent: Jan. 27, 2026

(54) MONITORING DEVICE, MANAGEMENT SYSTEM, AND MANAGEMENT METHOD

(71) Applicant: Panasonic Intellectual Property Management Co., Ltd., Osaka (JP)

(72) Inventors: Hiroyuki Okamoto, Kanagawa (JP); Akihiko Yamada, Hyogo (JP); Koji Hashimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1007 days.

(21) Appl. No.: 17/624,776

(22) PCT Filed: Jun. 30, 2020

(86) PCT No.: PCT/JP2020/025629
§ 371 (c)(1),
(2) Date: Jan. 4, 2022

(87) PCT Pub. No.: WO2021/014899
PCT Pub. Date: Jan. 28, 2021

(65) Prior Publication Data
US 2022/0242272 A1 Aug. 4, 2022

(30) Foreign Application Priority Data
Jul. 19, 2019 (JP) .................................. 2019-133612

(51) Int. Cl.
*B60L 53/68* (2019.01)
*H01M 10/48* (2006.01)
(Continued)

(52) U.S. Cl.
CPC ............. *B60L 53/68* (2019.02); *H01M 10/48* (2013.01); *H02J 7/0013* (2013.01); *H02J 7/02* (2013.01)

(58) Field of Classification Search
CPC ..... G01N 33/0098; B60L 53/68; H01M 10/48
See application file for complete search history.

(56) References Cited

U.S. PATENT DOCUMENTS

2016/0117759 A1 4/2016 Penilla et al.
2016/0359980 A1 12/2016 Penilla et al.
(Continued)

FOREIGN PATENT DOCUMENTS

EP 0 902 521 A2 3/1999
JP 11-150809 A 6/1999
(Continued)

OTHER PUBLICATIONS

International Search Report dated Sep. 29, 2020, issued in counterpart International Application No. PCT/JP2020/025629.(3 pages).

(Continued)

*Primary Examiner* — Lam S Nguyen
(74) *Attorney, Agent, or Firm* — WHDA, LLP

(57) ABSTRACT

The life of a power storage pack to be mounted on an electric vehicle is prolonged while maintaining user convenience. A monitoring device (1) communicates with a storage device (4) storing power storage packs (2) to be mounted on a electric vehicle (3) traveling at a low speed in a predetermined area. An acquisition unit of the monitoring device (1) acquires parameter information including information of a user who uses the electric vehicle (3) and state information of the power storage packs stored in the storage device (4). A prediction unit of the monitoring device (1) predicts an amount of power consumption of the electric vehicle (3) used by the user, based on the acquired parameter information. A selecting unit of the monitoring device (1) selects a combination of power storage packs to be mounted on the electric vehicle among the power storage packs, based on the predicted amount of power consumption and the acquired state information on the power storage packs.

18 Claims, 11 Drawing Sheets

(51) Int. Cl.
    *H02J 7/00*    (2006.01)
    *H02J 7/02*    (2016.01)

(56)            References Cited

U.S. PATENT DOCUMENTS

2018/0043785  A1    2/2018   Takatsuka et al.
2018/0253789  A1    9/2018   Takatsuka et al.

FOREIGN PATENT DOCUMENTS

| JP | 2001-8380 | A | 1/2001 | |
| JP | 2003-111212 | A | 4/2003 | |
| JP | 2013-90360 | A | 5/2013 | |
| JP | 2013-242195 | A | 12/2013 | |
| JP | 2015-69584 | A | 4/2015 | |
| JP | 2015-73427 | A | 4/2015 | |
| JP | 2016-15815 | A | 1/2016 | |
| JP | 2016-223784 | A | 12/2016 | |
| JP | 2017-91425 | A | 5/2017 | |
| WO | WO-2010033517 | A2 * | 3/2010 | .......... B60L 11/1816 |
| WO | 2013/080211 | A1 | 6/2013 | |

OTHER PUBLICATIONS

Extended (Supplementary) European Search Report dated Aug. 8, 2022, issued in counterpart EP application No. 20845043.7. (16 pages).

Office Action dated Jul. 21, 2025, issued in counterpart EP Application No. 20845043.7. (13 pages).

\* cited by examiner

FIG. 10(a)

| Combination | Number of Parallel-Connected Storage Packs | 1 | 2 | 3 | 4 | Total Capacity | Selection Result |
|---|---|---|---|---|---|---|---|
| A | Battery No. | 0013 | 0009 | | | 1.6kWh | ○ |
| | Capacity | 0.8kWh | 0.8kWh | | | | |
| | SOH | 90% | 90% | | | | |
| B | Battery No. | 0007 | 0011 | 0016 | | 1.6kWh | × |
| | Capacity | 0.53kWh | 0.53kWh | 0.53kWh | | | |
| | SOH | 60% | 60% | 60% | | | |

FIG. 10(b)

| Combination | Number of Parallel-Connected Storage Packs | 1 | 2 | 3 | 4 | Total Capacity | Selection Result |
|---|---|---|---|---|---|---|---|
| A | Battery No. | 0005 | 0002 | | | 1.6kWh | ○ |
| | Capacity | 0.8kWh | 0.8kWh | | | | |
| | SOH | 80% | 80% | | | | |
| B | Battery No. | 0004 | 0008 | | | 1.6kWh | × |
| | Capacity | 1.0kWh | 0.6kWh | | | | |
| | SOH | 100% | 60% | | | | |

MONITORING DEVICE, MANAGEMENT SYSTEM, AND MANAGEMENT METHOD

TECHNICAL FIELD

The present invention relates to a monitoring device, a management system, and a management method for managing power storage packs to be mounted on an electric vehicle traveling at a low speed.

BACKGROUND ART

In recent years, battery-powered golf carts have been increasing. Currently, most carts have a built-in battery, but carts employing detachable portable batteries are developed. A battery rental system with a battery exchanger accommodating a battery for rental has also been proposed (for example, PTL 1).

CITATION LIST

Patent Literature

PTL 1: Japanese Patent Laid-Open Publication No. 11-150809

SUMMARY

Technical Problem

In general, degradation of a secondary battery may be approximated by the sum of storage degradation and cycle degradation. The storage degradation depends on State of Charge (SOC) and a temperature. The cycle degradation depends on an SOC range, a temperature, and a current rate, in and at which the secondary battery is used. If the progress of degradation of the secondary battery is slowed, the number of exchange times of the secondary battery may be reduced, and resources may be effectively utilized. The slow progress of the degradation of the secondary battery is also advantageous to managing a golf course.

The present disclosure has been made in view of such a situation. An object of the present disclosure is to provide a technique for efficiently operating a power storage pack to be mounted in a low-speed electric vehicle while securing the convenience for users.

Solution to Problem

In order to solve the above problem, a monitoring device according to one aspect of the present disclosure is a monitoring device configured to communicate with a storage device that stores power storage packs to be mounted on an electric vehicle traveling at a low speed in a predetermined area. The monitoring device includes an acquisition unit configured to acquire parameter information including information of a user who uses the electric vehicle and state information of the power storage packs stored in the storage device, a prediction unit configured to predict an amount of power consumption of the electric vehicle by the user, based on the acquired parameter information, and a selecting unit configured to select a combination of power storage packs to be mounted on the electric vehicle among the power storage packs, based on the predicted amount of power consumption and the acquired state information of the plurality of power storage packs.

Note that any desired combinations of the above-described components and modifications of the features of the present disclosure in methods, devices, systems, computer programs, and the like are still effective as other aspects of the present invention.

Advantageous Effect of Invention

According to the present disclosure, a power storage pack to be mounted on a low-speed electric vehicle may be efficiently operated while the convenience for users is being secured.

BRIEF DESCRIPTION OF DRAWINGS

FIG. 3($b$) illustrates an example of a configuration of a mobile terminal device according to the embodiment.

FIGS. 10($a$) and 10($b$) are tables of specific examples of selection conditions under which a combination of battery packs is selected.

DETAIL DESCRIPTION OF PREFERRED EMBODIMENT

Figure 1:
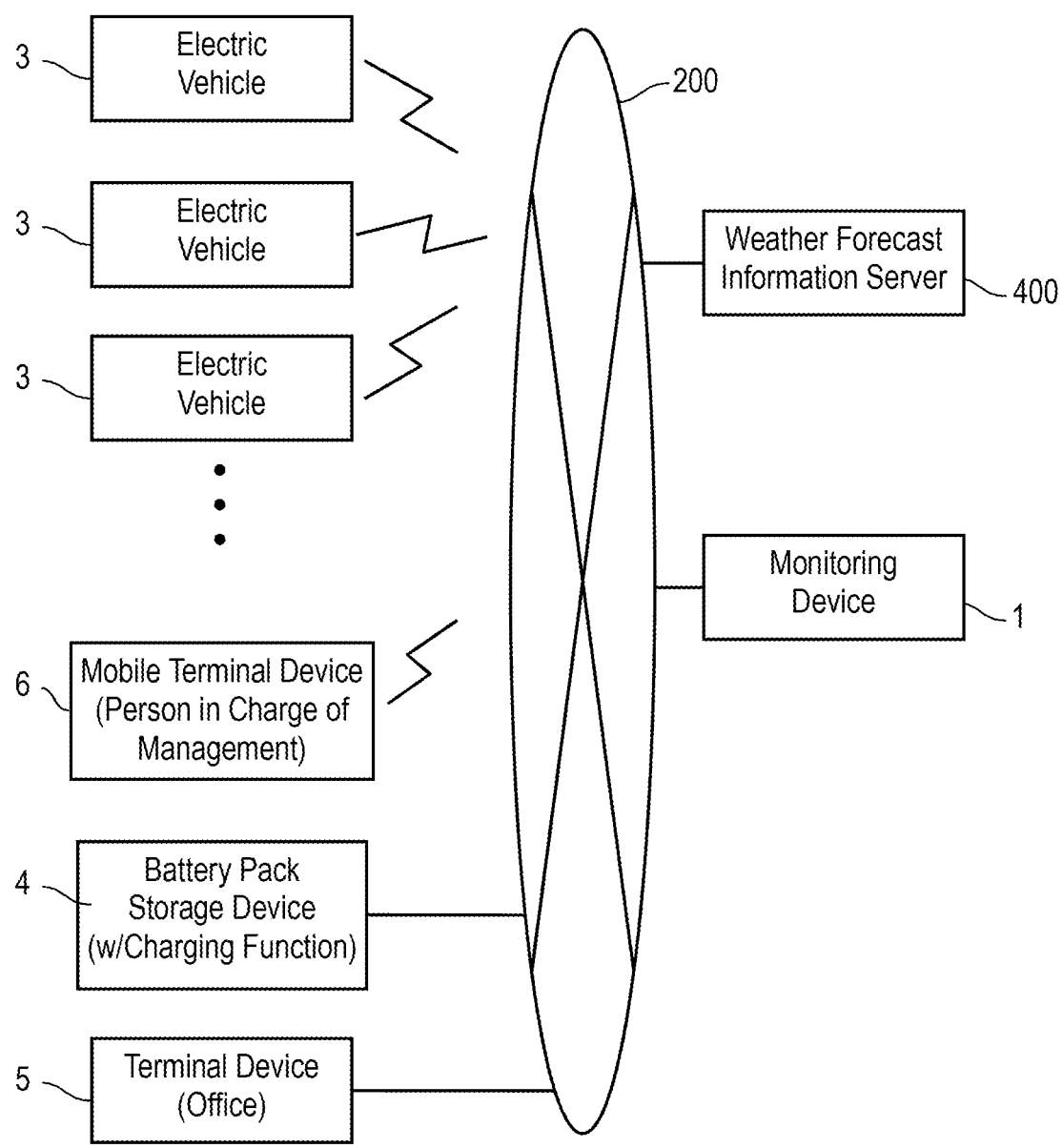
FIG. 1 illustrates an overall configuration of a management system for a battery pack according to an exemplary embodiment.

FIG. 1 is a diagram illustrating an overall configuration of management system 100 for a battery pack according to an exemplary embodiment. Management system 100 according to the embodiment is a system managed by a golf course management company. Management system 100 includes monitoring device 1, battery pack storage device 4, electric vehicles 3, terminal device 5, and mobile terminal device 6. These components may be connected to one another via network 200. Network 200 is general communication paths, such as the Internet and leased lines regardless of a communication medium or a protocol. As the communication medium, a wired local area network (LAN), a wireless LAN, a mobile telephone network (cellular network), an optical fiber network, a CATV network, or the like can be used.

A golf course management company owns plural golf carts to be lent to users who plays in a golf course. A golf cart is a vehicle used by a user who plays golf to move in the golf course. In the present embodiment, low-speed electric vehicle 3 whose maximum speed is about 20 km/h is used as the golf cart. Electric vehicle 3 is a pure electric vehicle (EV) which is not equipped with an engine is equipped with a detachable and exchangeable battery pack as a power supply.

Monitoring device 1 is a device configured to control entire management system 100, and mainly monitors the states of plural battery packs to be mounted on electric vehicle 3. Monitoring device 1 includes a cloud server installed in a data center. Note that monitoring device 1 may be configured with a server or a personal computer (PC) of the golf course management company. Terminal device 5 is installed in an office or reception of the golf course management company, and is mainly used to access monitoring device 1. Terminal device 5 includes a PC, a tablet, or the like. In a case where monitoring device 1 is configured with the server or PC of the company, monitoring device 1 and terminal device 5 may be configured with one server or PC.

Mobile terminal device 6 is a terminal device held by a person in charge of maintenance of the battery pack (hereinafter, referred to as a person in charge of battery). Mobile terminal device 6 may be implemented by a smartphone, a feature phone, a tablet, a small notebook PC, or the like.

Battery pack storage device 4 is a dedicated device configured to store the battery packs to be mounted on electric vehicle 3 and charge the battery packs. Battery pack storage device 4 is installed in a clubhouse or the like. The user takes out a battery pack from battery pack storage device 4 and goes to electric vehicle 3 with the battery pack. The user attaches the battery pack to electric vehicle 3 and gets into electric vehicle 3. A service person of the golf course may take out the battery pack from battery pack storage device 4 and mount the battery pack on electric vehicle 3.

A terminal device (not illustrated) of a user who reserves a round in advance via the Internet is also connected to network 200. Further, various information servers, such as weather forecast information server 400, are also connected to network 200.

Figure 2:
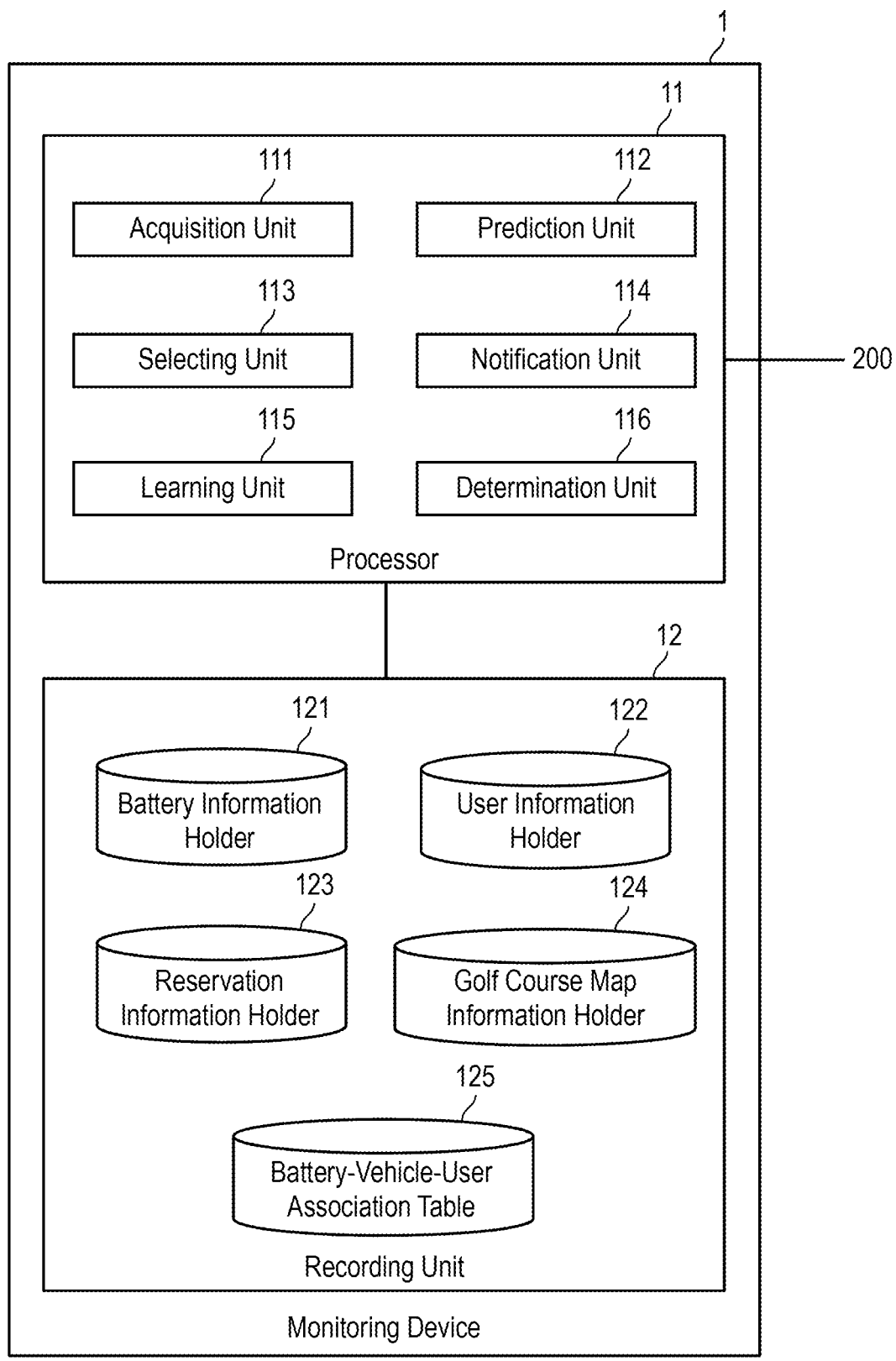
FIG. 2 illustrates an example of a configuration of a monitoring device according to the embodiment.

FIG. 2 illustrates an example of a configuration of monitoring device 1 according to the embodiment. Monitoring device 1 includes processor 11 and recording unit 12. Processor 11 includes acquisition unit 111, prediction unit 112, selecting unit 113, notification unit 114, learning unit 115, and determination unit 116. Processor 11 has a function achieved by cooperation of a hardware resource and a software resource, or by the hardware resource alone. The hardware resource may include a central processing unit (CPU), a graphics processing unit (GPU), a read only memory (ROM), a random access memory (RAM), an application specific integrated circuit (ASIC), a field programmable gate array (FPGA), and other large-scale integrated (LSI) circuits. Programs, such as an operating system and applications, may be used as the software resource.

Recording unit 12 includes battery information holder 121, user information holder 122, reservation information holder 123, golf course map information holder 124, and battery-vehicle-user association table 125. Recording unit 12 includes a non-volatile recording medium, such as a hard disk drive (HDD) or a solid state drive (SSD), and records various programs and data.

Figure 3A:
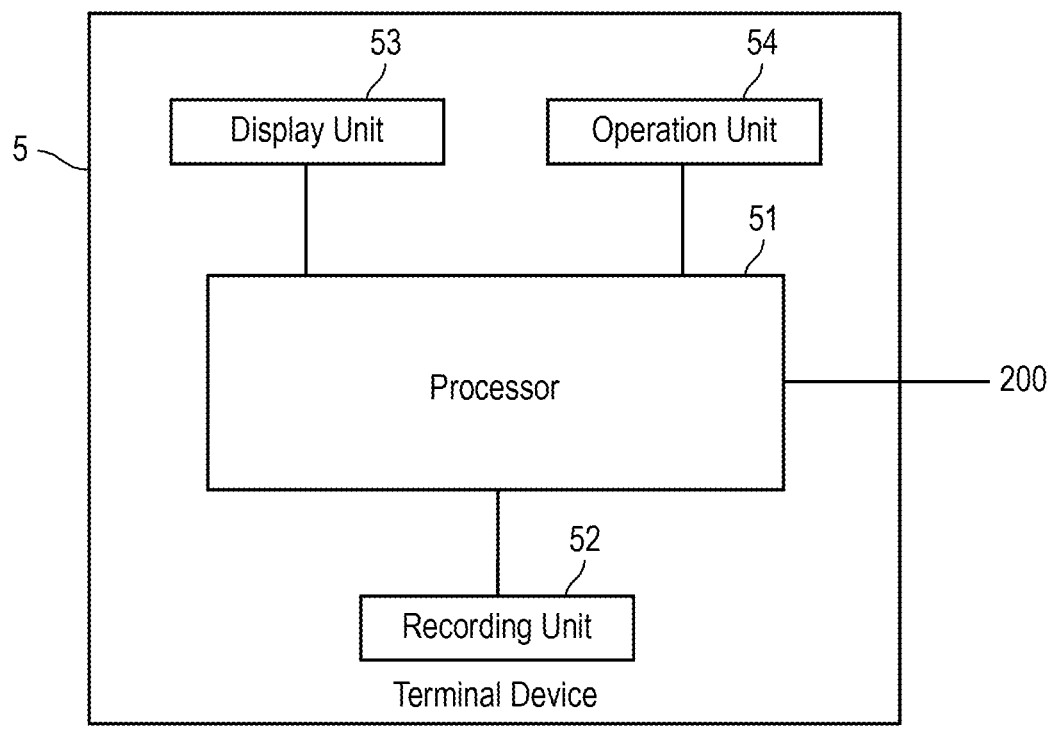
FIG. 3($a$) illustrates an example of a configuration of a terminal device according to the embodiment.
Figure 3B:
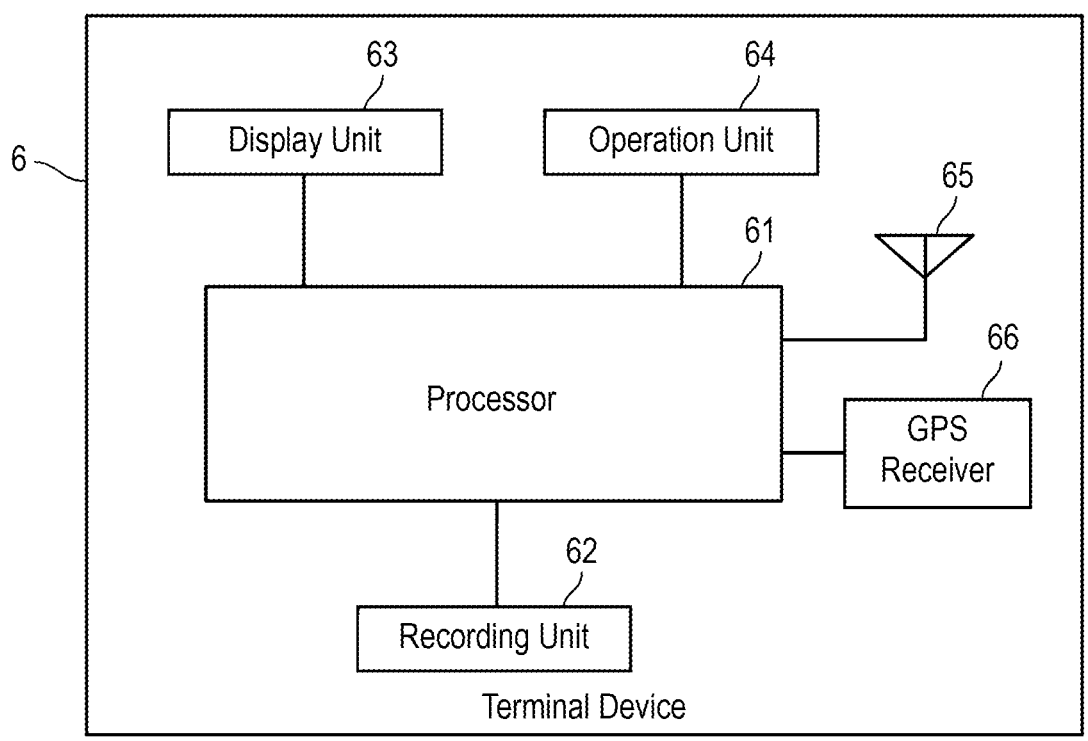

FIG. 3(*a*) illustrates an example of a configuration of terminal device 5 according to the exemplary embodiment. Terminal device 5 includes processor 51, recording unit 52, display unit 53, and operation unit 54. Processor 51 has a function achieved by cooperation of a hardware resource and a software resource, or by the hardware resource alone. A CPU, a GPU, a ROM, a RAM, an ASIC, an FPGA, and other LSIs can be used as the hardware resources. Programs, such as an operating system and applications, may be used as the software resource. Recording unit 52 includes a non-volatile recording medium such as an HDD or an SSD, and records various programs and data. Recording unit 52 may be configured to allow a recording medium, such as an optical disk, to be mounted thereto as an auxiliary recording unit.

Display unit 53 includes a display, such as a liquid crystal display or an organic electroluminescence (EL) display, and displays information generated by processor 51 thereon. Operation unit 54 is a user interface, such as a keyboard, a mouse, and a touch panel, and receives an operation on terminal device 5 performed by a user (employee of the golf course).

FIG. 3(*b*) illustrates an example of a configuration of mobile terminal device 6 according to the exemplary embodiment. Mobile terminal device 6 includes processor 61, recording unit 62, display unit 63, operation unit 64, antenna 65, and global positioning system (GPS) receiver 66. Processor 61 has a function achieved by cooperation of a hardware resource and a software resource, or by the hardware resource alone. A CPU, a GPU, a ROM, a RAM, an ASIC, an FPGA, and other LSIs can be used as the hardware resources. Programs such as an operating system and applications can be used as the software resource.

Processor 61 of mobile terminal device 6 executes signal processing for wireless connection to network 200 via antenna 65. For example, processor 61 executes signal processing for wirelessly communicating with a mobile phone base station or signal processing for wirelessly communicating with a wireless LAN access point.

Recording unit 62 includes a non-volatile recording medium such as a flash memory, and records various programs and data. Moreover, recording unit 62 may be configured to allow a recording medium such as a semiconductor memory card to be mounted thereto as an auxiliary recording unit.

Display unit 63 includes a display such as a liquid crystal display or an organic EL display, and displays information generated by processor 61. Operation unit 64 is a user interface such as a touch panel and a microphone, and receives operations on mobile terminal device 6 performed by a user (a person in charge of battery).

GPS receiver 66 detects position information on mobile terminal device 6 and outputs the detected position information to processor 61. Specifically, GPS receiver 66 receives, from a plurality of GPS satellites, radio waves including their respective transmission times, and calculates latitude and longitude of a reception point based on the plurality of transmission times included in the respective received radio waves.

Figure 4:
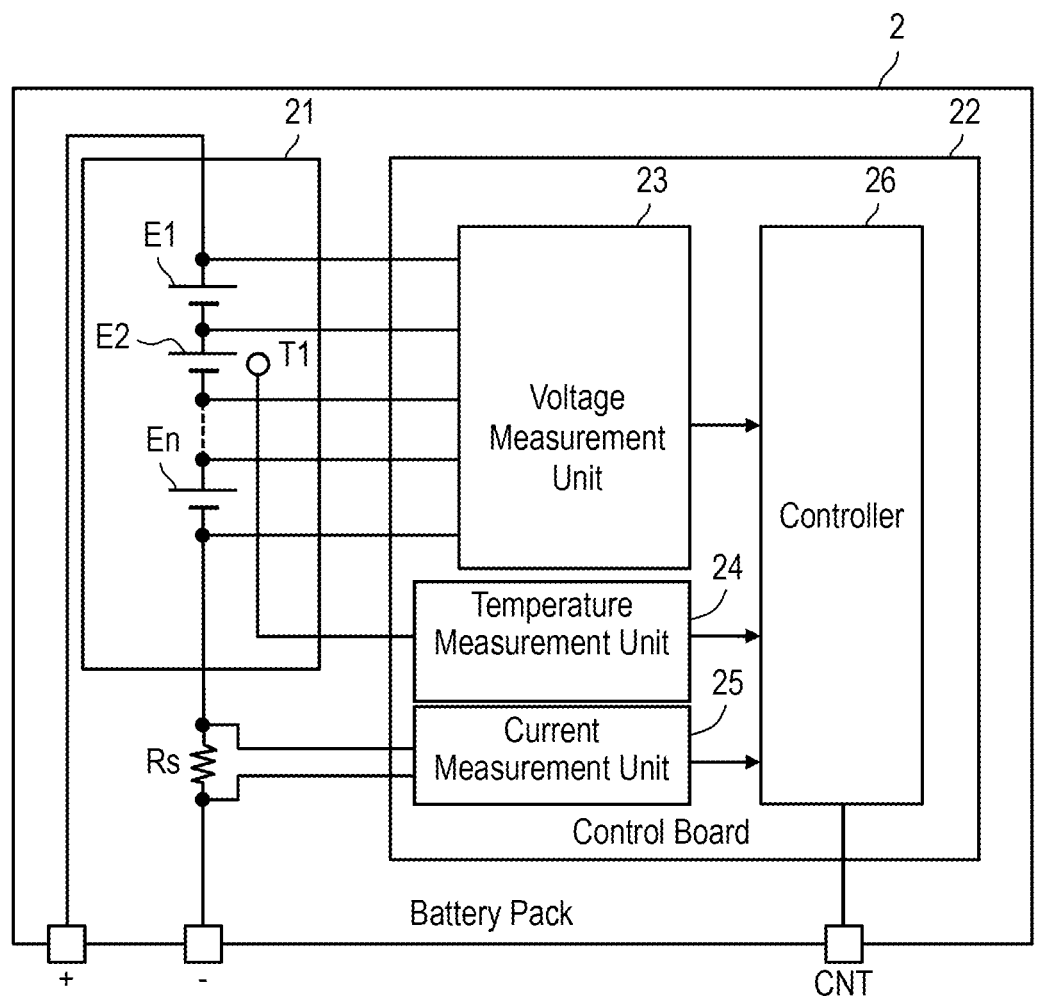
FIG. 4 illustrates an example of an internal configuration of a battery pack to be mounted on an electric vehicle.

FIG. 4 illustrates an example of an internal configuration of battery pack 2 to be mounted on electric vehicle 3. Battery pack 2 includes battery module 21 and control board 22. Battery module 21 includes plural cells E1 to En connected in series to one another. Battery module 21 may include plural battery modules connected in series or in series and parallel to one another. Each of the cells may be a lithium-ion battery cell, a nickel hydrogen battery cell, a lead battery cell, or the like. Hereinafter, an example using lithium ion battery cells (nominal voltage ranging from 3.6 V to 3.7 V) is assumed in this description. The number of series of cells E1 to En is determined in accordance with a drive voltage of motor 33.

Shunt resistor Rs is connected in series with the cells E1 to En. Shunt resistor Rs functions as a current detection element. A Hall element may be used instead of shunt resistor Rs. Battery module 21 is provided inside with temperature sensor T1 (for example, thermistor) for detecting temperatures of the plurality of cells E1 to En. Note that a plurality of temperature sensors T1 may be installed.

Control board 22 is provided with voltage measurement unit 23, temperature measurement unit 24, current measurement unit 25, and controller 26. Voltage measurement unit 23 and nodes at which the cells E1 to En are connected in series to one another are connected via plural voltage measurement lines. Voltage measurement unit 23 measures the voltage of each of cells E1 to En by measuring the voltage across two adjacent voltage measurement lines. Voltage measurement unit 23 transmits the measured voltages of cells E1 to En to controller 26.

Since voltage measurement unit 23 has a higher voltage than controller 26, voltage measurement unit 23 is connected to controller 26 via a communication line while being insulated from the controller. Voltage measurement unit 23 may be configured with an ASIC or a general-purpose analog front-end IC. Voltage measurement unit 23 includes a multiplexer and an A/D converter. The multiplexer outputs voltages across two adjacent voltage lines to the A/D converter in order from the top. The A/D converter converts analog voltages input from the multiplexer into digital values.

Temperature measurement unit 24 includes a voltage dividing resistor and an A/D converter. The A/D converter converts, into digital values, analog voltages which are divided by temperature sensor T1 and the voltage dividing resistor, and outputs the digital values to controller 26. Controller 26 estimates the temperatures of the cells E1 to En based on the digital values.

Current measurement unit 25 includes a differential amplifier and an A/D converter. The differential amplifier amplifies a voltage across shunt resistor Rs, and outputs the amplified voltage to the A/D converter. The A/D converter converts the analog voltage input from the differential amplifier into a digital value, and outputs the digital value to controller 26. Controller 26 estimates a current flowing through the cells E1 to En based on the digital value.

In the case that an A/D converter is mounted in controller 26 and an analog input port is installed in controller 26, temperature measurement unit 24 and current measurement unit 25 may output an analog voltage to controller 26, and the A/D converter in controller 26 may convert the analog voltage into a digital value.

Controller 26 may include a microcomputer and a non-volatile memory (for example, an electrically erasable programmable read-only memory (EEPROM) or a flash memory). Controller 26 manages the states of the cells E1 to En based on the voltages, the temperatures, and the currents of the cells E1 to En measured by voltage measurement unit 23, temperature measurement unit 24, and current measurement unit 25.

Controller 26 may estimate the SOC and a state of health (SOH) of each of the cells E1 to En. Controller 26 may estimate the SOC based on an open circuit voltage (OCV) method or a current integration method.

The SOH is defined as a ratio of current full charge capacity to initial full charge capacity. The SOH having a lower value (closer to 0%) indicates that degradation progresses more. The SOH may be obtained by measuring the capacity through full charging and discharging, or may be obtained by adding storage degradation and cycle degradation. The storage degradation may be estimated based on the SOC, the temperature, and a storage degradation rate. The cycle degradation may be estimated based on an SOC range of use, the temperature, the current rate, and a cycle degradation rate. The storage degradation rate and the cycle degradation rate may be derived previously by experiments or simulations. The SOC, the temperature, the SOC range, and the current rate may be determined by measurement.

The SOH may be estimated based on a correlation with internal resistance of each cell. The internal resistance may be estimated by obtaining a voltage drop generated due to a predetermined current flowing through the corresponding one of the cells for a predetermined time and dividing the voltage drop by the current value. The internal resistance decreases as the temperature rises, and increases as the SOH decreases.

Battery pack 2 includes, as external terminals, positive electrode terminal + connected to the positive electrode of battery module 21, negative electrode terminal – connected to the negative electrode of battery module 21, and control terminal CNT connected to control board 22.

Figure 5:
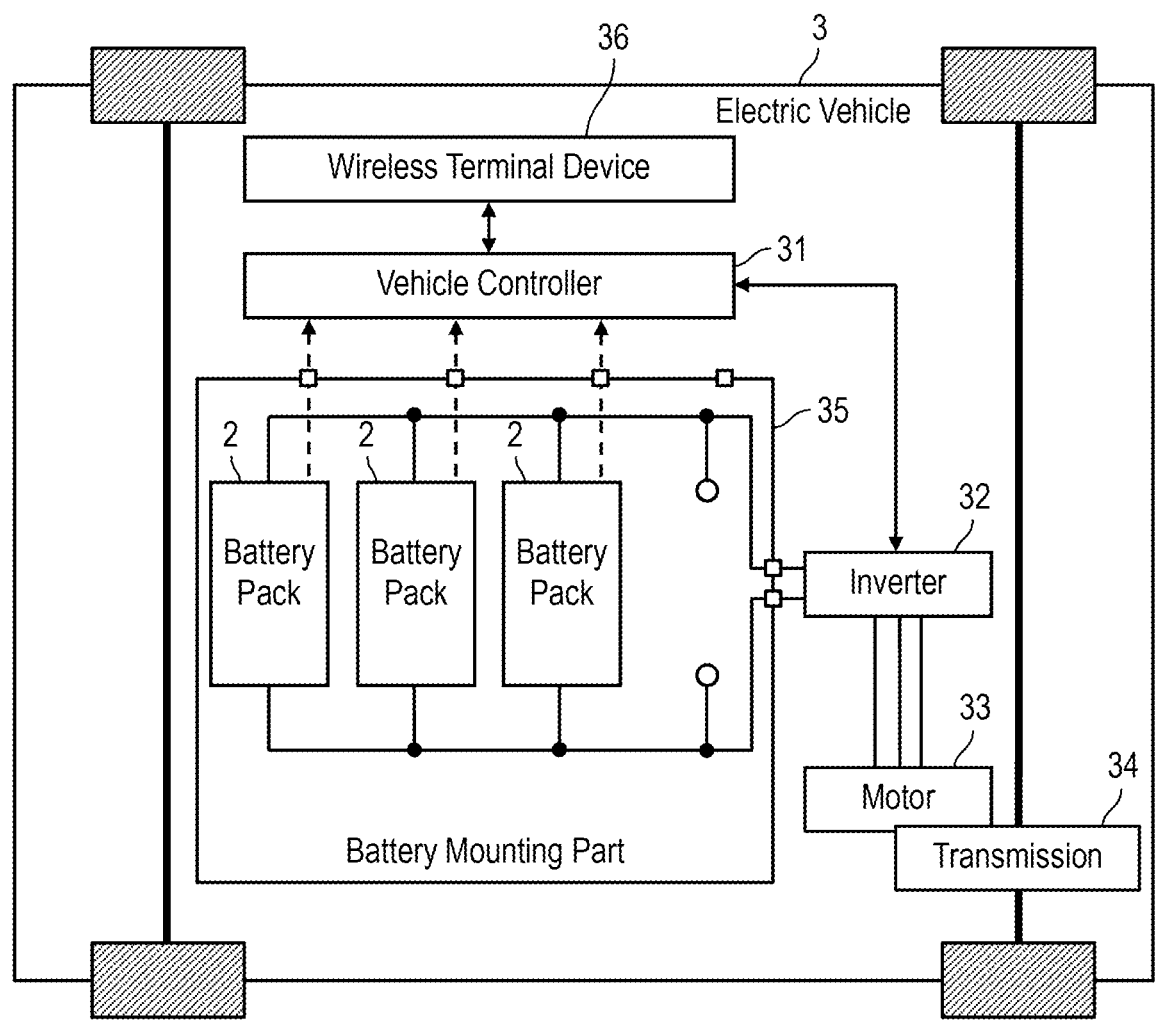
FIG. 5 illustrates a schematic configuration of the electric vehicle according to the embodiment.

FIG. 5 illustrates a schematic configuration of electric vehicle 3 according to the exemplary embodiment. Electric vehicle (EV) 3 illustrated in FIG. 5 is a rear-wheel-drive (2WD) EV including motor 33 as a power source. Transmission 34 transmits rotation of motor 33 to a rear wheel axle at a predetermined conversion ratio. Electric vehicle 3 may be a front-wheel-drive EV.

Electric vehicle 3 includes battery mounting part 35 where battery pack 2 is mounted. Battery mounting part 35 has mounting slots (four slots shown in FIG. 5). Each mounting slot includes a positive electrode terminal, a negative electrode terminal, and a control terminal. When battery pack 2 is mounted, positive electrode terminal +, negative electrode terminal –, and control terminal CNT of battery pack 2 are energized. The positive electrode terminals and the negative electrode terminals of the mounting slots are connected by wiring. Therefore, the battery packs 2 (three battery packs shown in FIG. 5) mounted to the mounting slots are electrically connected in parallel to one another. Therefore, as the number of battery packs 2 mounted to battery mounting part 35 increases, the capacity increases.

The positive electrode terminal and the negative electrode terminal of battery mounting part 35 are connected to a positive electrode terminal and a negative electrode terminal of inverter 32, respectively. Control terminal CNT of each battery pack 2 mounted to battery mounting part 35 is connected to a control terminal of vehicle controller 31 via a signal line.

Inverter 32 converts direct-current (DC) power supplied from at least one battery pack 2 mounted to battery mounting part 35 into alternating-current (AC) power and supplies the AC power to motor 33 at the time of power running. Inverter 32 converts the AC power supplied from motor 33 into DC power and supplies the DC power to at least one battery pack 2 mounted to battery mounting part 35 at the time of regeneration. Motor 33 is a three-phase AC motor, and rotates in accordance with the AC power supplied from inverter 32 at the time of power running. Motor 33 converts rotational energy generated by deceleration into AC power and supplies the AC power to inverter 32 at the time of regeneration.

Vehicle controller 31 is a vehicle electronic control unit (ECU) configured to entirely control electric vehicle 3. Vehicle controller 31 may acquire battery state information from battery pack 2 mounted to battery mounting part 35. The battery state information includes at least one of the voltage, the temperature, the current, the SOC, and the SOH of each of cells E1 to En. In addition, vehicle controller 31 may acquire the speed and the travel distance of electric vehicle 3.

Figure 6:
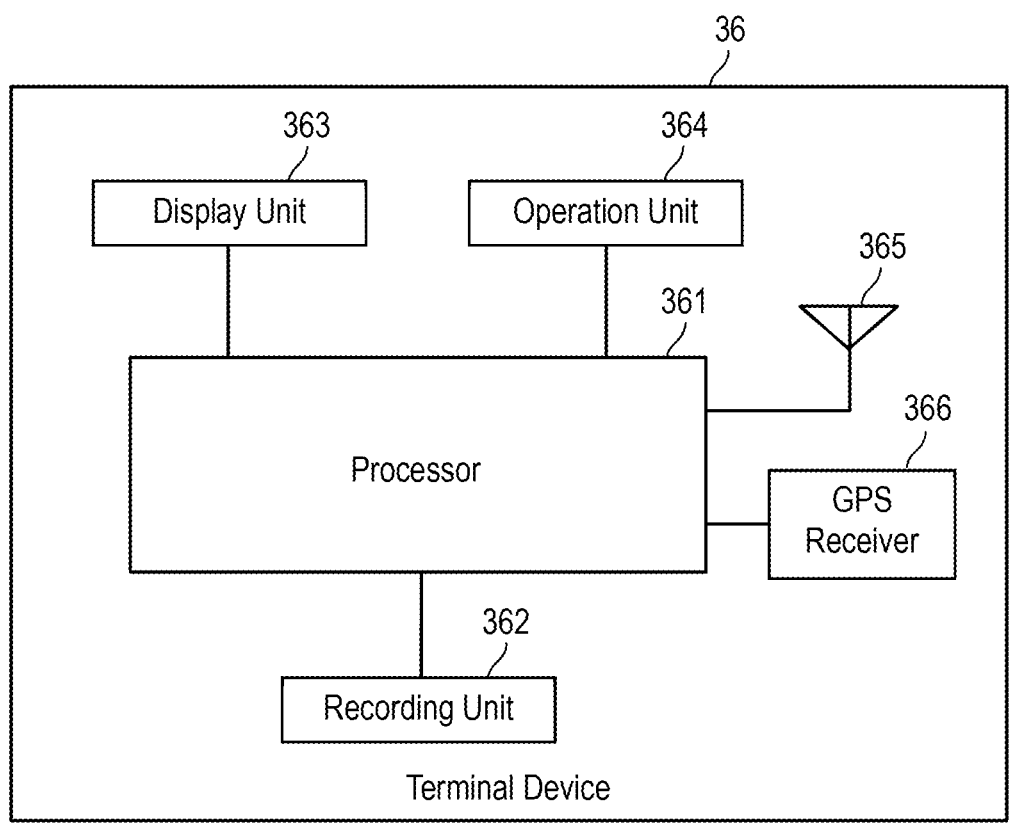
FIG. 6 illustrates an example of a configuration of a wireless terminal device shown in FIG. 5.

FIG. 6 illustrates an example of a configuration of wireless terminal device 36 shown in FIG. 5. Wireless terminal device 36 includes, for example, a tablet. Wireless terminal device 36 includes processor 361, recording unit 362, display unit 363, operation unit 364, antenna 365, and GPS receiver 366. Processor 361 has a function achieved by cooperation of a hardware resource and a software resource, or by the hardware resource alone. Recording unit 362 records various programs and data.

Processor 361 may acquire, from vehicle controller 31, state information on each battery pack 2 mounted to battery mounting part 35, and vehicle information such as the speed and travel distance of electric vehicle 3. Processor 361 acquires position information on electric vehicle 3 from GPS receiver 366. Processor 361 executes signal processing for wireless connection to network 200 via antenna 365. Processor 361 may communicate with monitoring device 1 connected to network 200 via a mobile phone network (3G, 4G, or 5G). Processor 361 transmits the acquired state information on battery pack 2 and the position information on electric vehicle 3 to monitoring device 1 in real time or periodically. In the case of periodic transmission, for example, information is transmitted every time when electric vehicle 3 stops.

Display unit 363 includes a display, and is configured to display various types of information to the user who is shooting a round of golf on the display. Display unit 363 displays course information, information on a distance to a hole position, and the like. Operation unit 364 is a user interface such as a touch panel, and receives an operation from a user who is in the vehicle.

Figure 7:
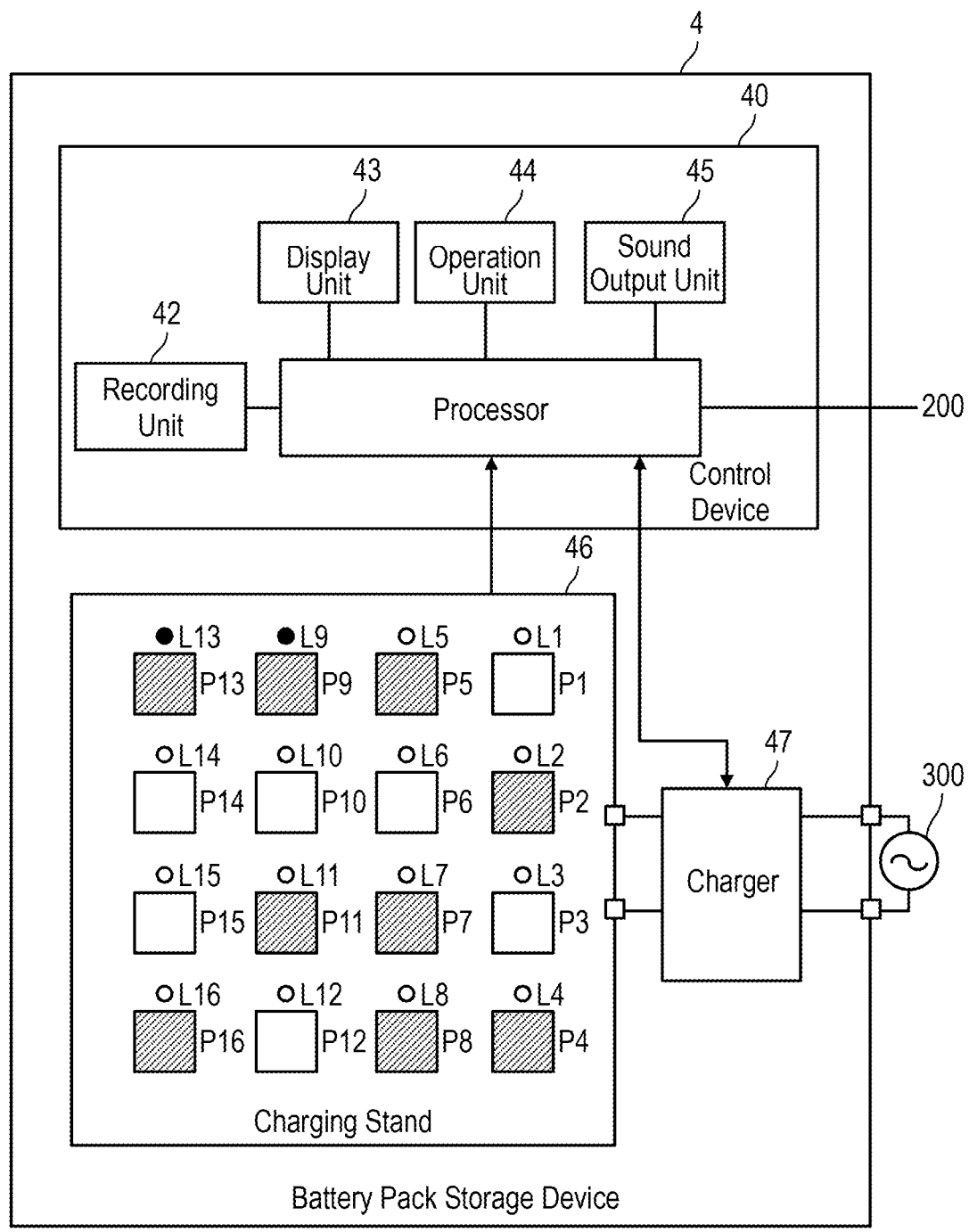
FIG. 7 illustrates a configuration of a battery pack storage device according to the embodiment.

FIG. 7 illustrates a configuration of battery pack storage device 4 according to the exemplary embodiment. Battery pack storage device 4 includes control device 40, charging stand 46, and charger 47. Charging stand 46 has mounting slots P1 to P16 for mounting battery packs 2. Each of mounting slots P1 to P16 has a positive electrode terminal, a negative electrode terminal, and a control terminal. When battery pack 2 is mounted, positive electrode terminal +, negative electrode terminal −, and control terminal CNT of battery pack 2 are energized. Control terminal CNT of each battery pack 2 mounted to charging stand 46 is connected to the control terminal of control device 40 via a signal line.

The positive electrode terminal and the negative electrode terminal of each of mounting slots P1 to P16 are connected to the positive electrode terminal and the negative electrode terminal of charger 47. Charger 47 is connected to commercial power system 300, and is configured to charge battery pack 2 mounted to charging stand 46. Charger 47 full-wave rectifies AC power supplied from commercial power system 300, and smooths the AC power by a filter to generate DC power.

Switches, not illustrated, are connected between each of the positive electrode terminal and the negative electrode terminal of charger 47 and respective one of the positive electrode terminal and the negative electrode terminal of each of mounting slots P1 to P16. Control device 40 controls energization and interruption of each of mounting slots P1 to P16 by turning on and off the switches. A DC/DC converter, not illustrated, may be provided between each of the positive electrode terminal and the negative electrode terminal of charger 47 and respective one of the positive electrode terminal and the negative electrode terminal of each of mounting slots P1 to P16. In this case, control device 40 controls the DC/DC converter to control the charging voltage or the charging current of each battery pack 2. For example, constant current (CC) charging or constant voltage (CV) charging may be performed. The DC/DC converter may be provided in battery pack 2. The AC/DC converter mounted on battery pack 2 may be charged with AC power from charger 47.

Control device 40 includes processor 41, recording unit 42, display unit 43, operation unit 44, and sound output unit 45. Processor 41 has a function achieved by cooperation of a hardware resource and a software resource, or by the hardware resource alone. Processor 41 can acquire battery state information from battery pack 2 mounted to charging stand 46. The battery state information includes at least one of the voltage, the temperature, the current, the SOC, and the SOH of the plurality of cells E1 to En. Processor 41 can communicate with monitoring device 1 via network 200. Recording unit 42 records various programs and data.

Display unit 43 has a display and displays guidance to a user (player) on the display. In addition, display unit 43 has lamps L1 to L16 in the vicinity of mounting slots P1 to P16 of charging stand 46. Processor 41 turns on the lamp at the mounting slot in which battery pack 2 to be used by the user is mounted. The user takes out battery pack 2 from the mounting slot at which the lamp is lit and mounts battery pack 2 on electric vehicle 3.

Sound output unit 45 includes a speaker and outputs audio guidance to the user. Operation unit 44 is a user interface such as a touch panel, and receives an operation from a user who uses battery pack storage device 4.

An operation of management system 100 according to the exemplary embodiment will be described below. When the user inputs golf reservation information through his or her terminal device (not illustrated), acquisition unit 111 of monitoring device 1 acquires the reservation information via network 200 and stores the reservation information in reservation information holder 123. The reservation information includes a user name, a user ID, the number of users, a date, a reservation number, a start time, and a start course. A first-time user also inputs personal information such as a name, an address, a date of birth, a telephone number, a mail address, and an average score (self-report). In the case of the first-time user, acquisition unit 111 of monitoring device 1 stores the acquired personal information and user ID in user information holder 122.

Note that an operator of the golf course may acquire reservation information through a telephone or e-mail, input the reservation information through operation unit 54 of terminal device 5, and acquisition unit 111 of monitoring device 1 may acquire the reservation information.

After the end of the business hours of the golf course, processor 11 of monitoring device 1 determines the number of battery packs 2 to be charged among all battery packs 2 owned by the golf course, based on the reservation information for the next day. The number of battery packs 2 to be charged is obtained by adding a predetermined margin to the number of battery packs 2 required for reservation for the next day. In a golf course with many customers on the day, a larger margin is set. In addition, a larger margin is set as a spare in case of an abnormality in the battery packs.

To prevent degradation of battery packs 2, the charging is preferably performed at a current rate as low as possible such that the charging is completed immediately before the opening hours of the golf course. Processor 11 of monitoring device 1 transmits a charging command including the number of battery packs 2 to be charged, the charging rate, and the charging end time to control device 40 of battery pack storage device 4. Control device 40 charges the instructed number of battery packs 2 among battery packs 2 mounted on charging stand 46, based on the received charging command.

Battery pack 2 to be charged is basically charged to the full charge capacity. However, in a case where a half round is reserved or in a case where an advanced-level person makes a reservation, battery pack 2 charged to X % (60%, 80%, etc.) of the full charge capacity may be prepared.

A low skilled user tends to have a zigzag travel route of electric vehicle 3 along a longer travel distance. On the other hand, a high skilled user such as a single player tends to have less waste in the travel route of electric vehicle 3 along a shorter travel distance. Since the power consumption of electric vehicle 3 is proportional to the travel distance, electric vehicle 3 into which a lower skilled user gets requires a larger battery capacity. Processor 11 of monitoring device 1 predicts a necessary battery capacity in accordance with the skill of a user, and determines a combination of battery packs 2 to be mounted on electric vehicle 3 the user rides on. A detailed description will be given below.

Figure 8:
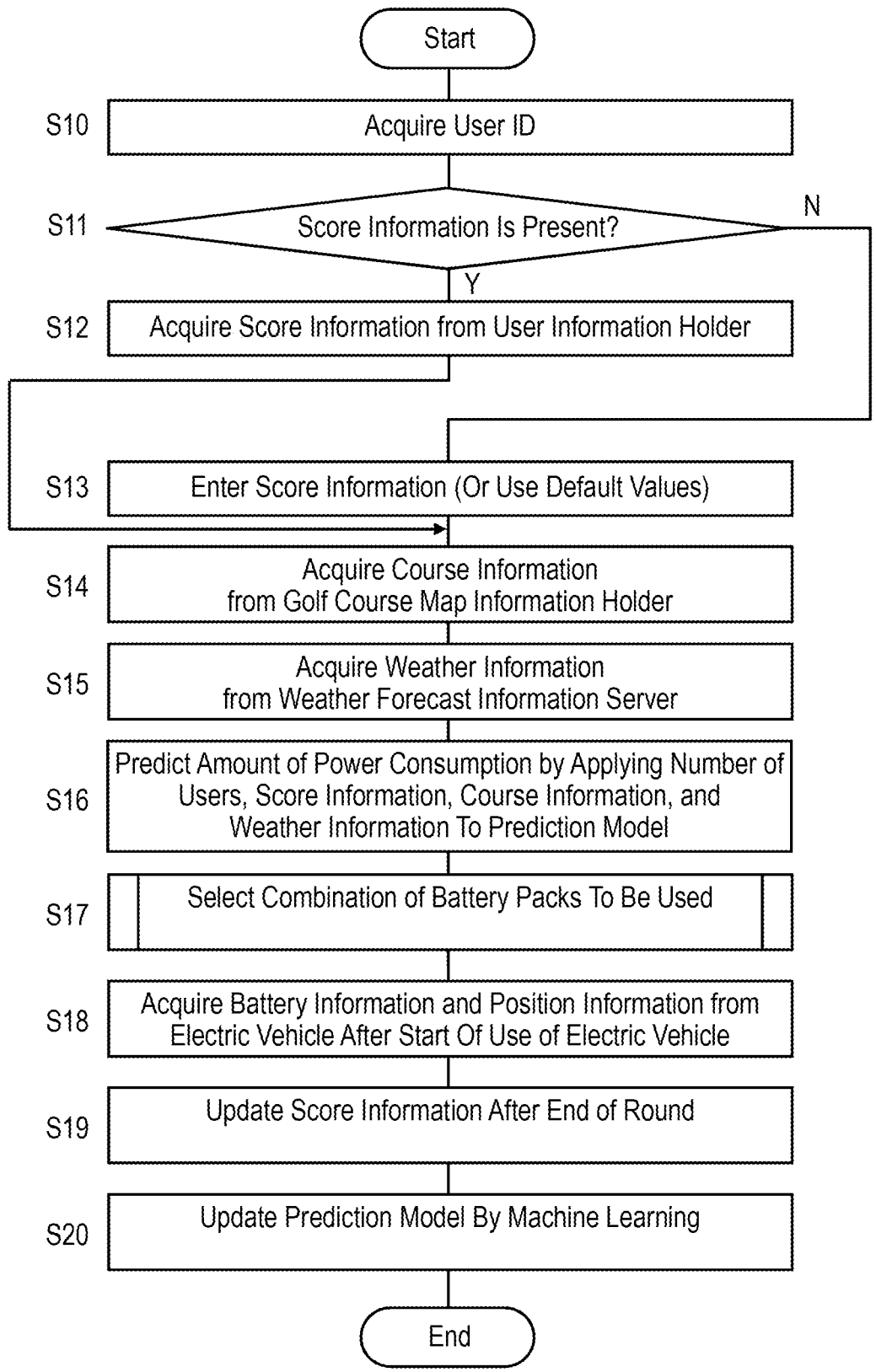
FIG. 8 is a flowchart illustrating an example of processing for selecting a battery pack to be mounted on the electric vehicle on which a user rides, in the monitoring device according to the embodiment.

FIG. 8 is a flowchart illustrating an example of processing for selecting battery packs 2 to be mounted on electric vehicle 3 the user rides on. The process is executed by monitoring device 1 according to the exemplary embodiment. When the user arrives at the reception of the golf course, the user notifies the receptionist of a reservation number. When a receptionist inputs the reservation number through operation unit 54 of terminal device 5, processor 51 of terminal device 5 transmits the input reservation number to monitoring device 1. Acquisition unit 111 of monitoring device 1 acquires the user ID of the player based on the reservation number received from terminal device 5 (step S10).

Acquisition unit 111 refers to user information holder 122 based on the acquired user ID and checks whether score information on the user is included (step S11). When the score information is included ("Y" in step S11), acquisition unit 111 acquires the score information on the user from user information holder 122 (step S12). As the score information, for example, an average score of previous scores of previous rounds on the golf course is used.

When the score information is not included ("N" in step S11), acquisition unit 111 acquires score information that is self-reported by the user and is input by the operator through operation unit 54 of terminal device 5 (step S13). In a case where the score information is not self-reported by the user, a default value is used as the score information. For example, the average score of the golf course can be used as the default value. In a case where plural users play golf, score information is acquired for each user.

Acquisition unit 111 acquires course information from golf course map information holder 124 (step S14). The course information includes the distance from a tee ground to the hole position on the day, the position and distance of a cart road, the state of lawn in the course, the inclination state of the course, and the like.

Acquisition unit 111 acquires weather information on an area where the golf course is located from weather forecast information server 400 via network 200 (step S15). The weather information includes a temperature, a humidity, a wind direction, a wind speed, and the like. In the case of rain, precipitation is also included.

In general, a rate of power consumption of electric vehicle 3 depends on a weight on board. Therefore, as the number of users who ride on electric vehicle 3 increases, the rate of power consumption decreases. The rate of power consumption of electric vehicle 3 depends on an ambient temperature. The rate of power consumption decreases with decreasing temperature. The rate of power consumption of electric vehicle 3 also depends on a road surface condition. Specifically, the rate of power consumption is lower on lawn than on asphalt. The rate of power consumption is lower on rough than on fairway. When the road surface is wet with rain, the rate of power consumption is lower than when the road surface is dry. The rate of power consumption of electric vehicle 3 also depends on the inclination angle of the road surface. The rate of power consumption decreases as electric vehicle 3 climbs a slope having a larger inclination angle. The rate of power consumption of electric vehicle 3 also depends on a wind direction. In a case of strong head wind, the rate of power consumption decreases.

Prediction unit 112 provides at least one of the number of users, the score information, the course information, and the weather information as a parameter to a power consumption prediction model (power consumption predictor) generated by a multiple regression analysis, and predicts an amount of power consumption of electric vehicle 3 used by the user (step S16).

For example, the prediction model may be generated by using the average travel distance of electric vehicle 3 of all users who use the golf course using the number of users and the score information as parameters. In a case where plural users shoots a round, the score information on a user with lowest skill among the users is used as the score information.

In addition, the prediction model may be generated using the number of users, the score information, the shortest travel distance derived from the course information on the day, and the temperature as parameters. Furthermore, parameters such as inclination, wind speed, and precipitation may also be used for the prediction model.

Next, a combination of battery packs 2 to be mounted on electric vehicle 3 the user rides on is determined (step S17).

Figure 9:
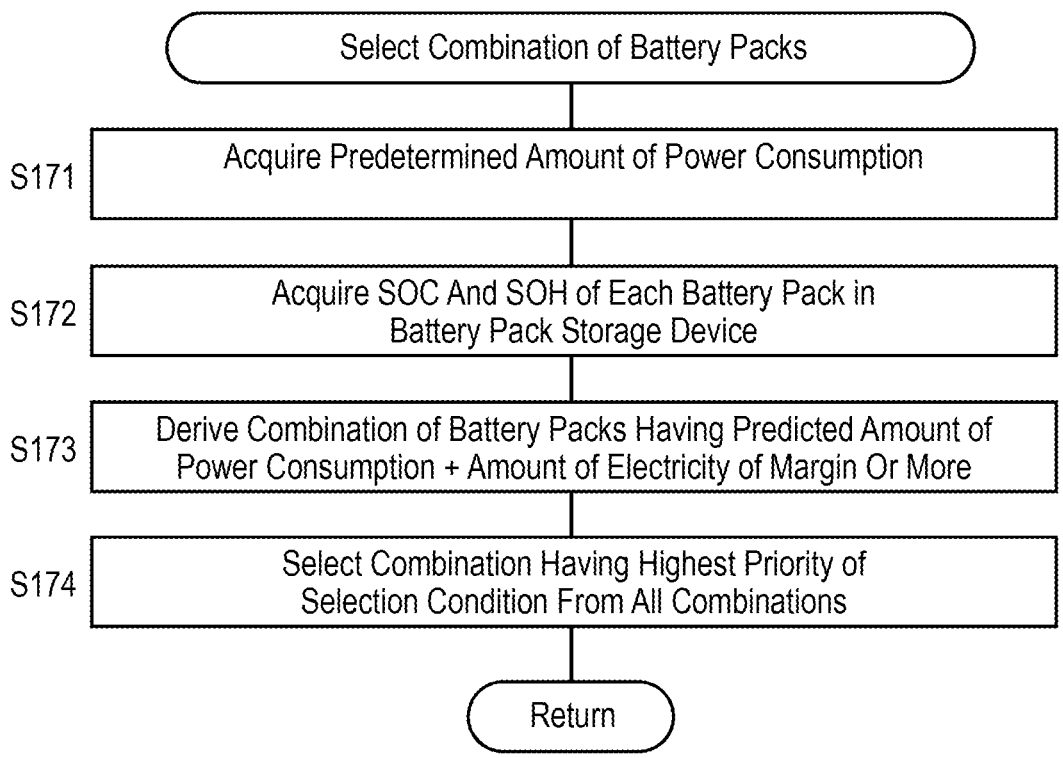
FIG. 9 illustrates a subroutine as an example of processing for selecting a combination of battery packs in the flowchart of FIG. 8.

FIG. 9 illustrates a subroutine as an example of the processing for selecting a combination of battery packs 2 in the flowchart shown in FIG. 8. Acquisition unit 111 acquires the amount of power consumption predicted by prediction unit 112 (step S171). Acquisition unit 111 acquires the SOC and the SOH of each of the battery packs 2 stored in battery pack storage device 4 (step S172). In the above description, an example is assumed in which the SOC and SOH of each of cells E1 to En are calculated by controller 26 in each battery pack 2, and the entire SOC and SOH of battery pack 2 are calculated. Alternatively, controller 26 in battery pack 2 may only notify the outside of the voltage, the temperature, and the current of each of cells E1 to En without calculating the SOC and SOH. In this case, control device 40 of battery pack storage device 4 or monitoring device 1 calculates the SOC and SOH of each battery pack 2.

Selecting unit 113 calculates the current charge capacity [kWh] of each battery pack 2 based on the SOC, SOH, and initial capacity of each battery pack 2. Note that the current charge capacity of battery pack 2 may be acquired directly from controller 26 in battery pack 2.

Selecting unit 113 derives all combinations of battery packs 2 in which an amount of electricity (hereinafter, referred to as necessary capacity) is larger than or equal to a value obtained by adding a predetermined margin to the predicted amount of power consumption (step S173). Selecting unit 113 selects a combination having the highest priority of the selection condition from all the derived combinations (step S174).

FIGS. 10(a) and 10(b) are tables of specific examples of selection conditions under which a combination of battery packs 2 is selected. FIGS. 10(a) and 10(b) illustrate the examples in which the necessary capacity is 1.6 kWh. The initial capacity of battery pack 2 is 1 kWh.

FIG. 10(a) illustrates an example of the selection conditions under which as the number of parallel-connected power storage packs is smaller, the priority is higher. As the number of parallel-connected power storage packs is smaller, the number of battery packs 2 to be mounted on electric vehicle 3 decreases, and the weight on board of electric vehicle 3 is reduced. The reduction in the weight on board results in a reduction in the rate of power consumption. In addition, since the number of battery packs 2 to be taken out from battery pack storage device 4 and mounted on electric vehicle 3 by the user is reduced, a work load on the user is reduced.

In FIG. 10(a), combination candidate "A" is a combination of battery packs of battery Nos. 0013 and 0009. The battery pack of battery No. 0013 has a current capacity of 0.8 kWh and an SOH of 90%. The battery pack of battery No. 0009 also has a current capacity of 0.8 kWh and an SOH of 90%. Both of the battery packs are charged with a capacity being lower than the full charge capacity.

Combination candidate "B" is a combination of battery packs of battery Nos. 0007, 0011, and 0016. The battery pack of battery No. 0007 has a current capacity of 0.53 kWh and an SOH of 60%. The battery pack of battery No. 0011 also has a current capacity of 0.53 Wh and an SOH of 60%. The battery pack of battery No. 0016 also has a current capacity of 0.53 Wh and an SOH of 60%. The three battery packs are charged with their capacities being lower than the full charge capacity.

Combination candidate "A" is selected from candidates "A" and "B" because of the smaller number of parallel-connected power storage packs.

FIG. 10(b) illustrates an example of the selection conditions under which the smaller the variations in degradation is, the higher the priority is. When battery packs 2 having small variations in degradation are connected in parallel, the occurrence of a cross current between battery packs 2 can be prevented.

In FIG. 10(b), combination candidate "A" is a combination of battery packs of battery Nos. 0005 and 0002. The battery pack of battery No. 0005 has a current capacity of 0.8 kWh and an SOH of 80%. The battery pack of battery No. 0002 also has a current capacity of 0.8 kWh and an SOH of 80%. Both the battery packs are charged to the full charge capacity.

Combination candidate "B" is a combination of battery packs of battery Nos. 0004 and 0008. The battery pack of battery No. 0004 has a current capacity of 1.0 kWh and an SOH of 100%. The battery pack of battery No. 0008 has a current capacity of 0.6 Wh and an SOH of 60%. Both the battery packs are charged to the full charge capacity.

Combination candidate "A" is selected from candidates "A" and "B" because of a smaller variation in SOH.

Various selection conditions are conceivable in addition to the selection conditions described as the specific examples in FIGS. 10(a) and 10(b). For example, the selection condition may be determined such that as the deterioration progresses, the priority is higher. In this case, a combination having the smallest total SOH is selected from the combination candidates. In this case, battery pack 2 may be used up quickly, and the depreciation of battery pack 2 may be accelerated. In addition, when battery packs 2 are desired to be replaced at about the same time, a combination of battery packs 2 is selected such that the SOHs of battery packs 2 in the golf course approach their average value or median value.

The selection condition may be determined in each golf course in accordance with a management policy of the course. Further, stepwise selection conditions (a first selection condition→second selection condition→ . . . ) may be determined.

The description returns to FIG. 8. Notification unit 114 of monitoring device 1 notifies, via network 200, control device 40 in battery pack storage device 4 and terminal device 5 of the combination information of battery packs 2 specified by selecting unit 113. The combination information of battery packs 2 includes identification information on each of battery packs 2 constituting the combination. Hereinafter, in accordance with the exemplary embodiment, a unique identification number is assigned to each battery pack 2 in the golf course. A unique identification number is assigned also to each electric vehicle 3 in the golf course.

The receptionist of the golf course checks that the combination of battery packs 2 to be mounted on electric vehicle 3 the user rides on is specified through terminal device 5. The receptionist then gives the user a key of electric vehicle 3 and a score card.

The user goes to the location of battery pack storage device 4 and takes out the specified combination of battery packs 2 from charging stand 46 of battery pack storage device 4. For example, only the lamps at the mounting slots storing specified combination of battery packs 2 may be turned on. In the example illustrated in FIG. 7, lamp L9 at ninth mounting slot P9 having battery pack 2 of battery No. 0009 and lamp L13 at thirteenth mounting slot P13 having battery pack 2 of battery No. 0013 are turned on.

For example, when the user holds the key received from the receptionist over a reader, not illustrated, of battery pack storage device 4, the lamp at the mounting slot storing battery pack 2 to be taken out by the user may be turned on. Alternatively, charging stand 46 may be designed to prevent battery packs 2 from being physically taken out of the mounting slots other than the mounting slot storing battery pack 2 to be taken out by the user.

A guidance image indicating the position of battery pack 2 to be taken out may be displayed on display unit 43 of battery pack storage device 4. Alternatively, an audio guidance including the battery No. of battery pack 2 to be taken out may be output from sound output unit 45 of battery pack storage device 4. The lighting of the lamp, the display of the guidance image on display unit 43, and the output of the audio guidance from sound output unit 45 may be used in combination, or any one of them may be performed.

The user goes to the parking position of electric vehicle 3 with battery pack 2 taken out from the charging base 46 of battery pack storage device 4, and mounts battery pack 2 to electric vehicle 3. When battery pack 2 is mounted to battery mounting part 35, wireless terminal device 36 of electric vehicle 3 notifies monitoring device 1 of the identification number of mounted battery pack 2 and the identification number of the vehicle via network 200.

When receiving the identification number of battery pack 2 and the identification number of electric vehicle 3 from wireless terminal device 36 of electric vehicle 3, acquisition unit 111 of monitoring device 1 registers the identification number of battery pack 2, the identification number of electric vehicle 3, and the user ID of the user who rides on electric vehicle 3 in battery-vehicle-user table 125 in association with each other.

When the user gets into electric vehicle 3 and departs for the course, wireless terminal device 36 of electric vehicle 3 notifies monitoring device 1 of the state information on battery pack 2 and the position information on electric vehicle 3 in real time or periodically via network 200. Wireless terminal device 36 gives the SOC of battery pack 2 as the state information on battery pack 2. Wireless terminal device 36 may give the voltage, the temperature, and the current of each of cells E1 to En in addition to or instead of the SOC. Note that the charge capacity may be given instead of the SOC. Wireless terminal device 36 notifies monitoring device 1 of latitude and longitude information acquired from GPS receiver 366 as the position information of electric vehicle 3. Wireless terminal device 36 may acquire vehicle information such as a speed and a travel distance of electric vehicle 3 from vehicle controller 31 and allow the vehicle information to be included in notification information to be given to monitoring device 1.

When at least one of overvoltage, undervoltage, overcurrent, and temperature abnormality occurs in any of the cells in battery pack 2, wireless terminal device 36 urgently transmits an abnormality signal of battery pack 2 to monitoring device 1 regardless of the timing of the notification to monitoring device 1. In addition, also when an abnormality (a breakdown of motor 33 or the like) occurs in electric vehicle 3, wireless terminal device 36 urgently transmits an abnormality signal of electric vehicle 3 to monitoring device 1 regardless of the timing of notification to monitoring device 1.

Acquisition unit 111 of monitoring device 1 acquires the state information of battery pack 2 and the position information on electric vehicle 3 from wireless terminal device 36 of electric vehicle 3 (S18). Acquisition unit 111 updates the battery information of corresponding battery pack 2 held in battery information holder 121, based on the acquired state information on battery pack 2. Battery information holder 121 may manage only the current values of the SOC and SOH of each battery pack 2, or may accumulate the usage history of each battery pack 2. For example, battery information holder 121 may store chronological data indicating the transition of the voltage, temperature, and current of each of cells E1 to En during use of battery pack 2.

Determination unit 116 of monitoring device 1 determines whether or not a capacity shortage occurs in electric vehicle 3, based on the state information of battery pack 2 used in electric vehicle 3 and the position information on electric vehicle 3. Determination unit 116 determines whether or not a capacity shortage occurs during the round, based on the remaining travel distance predicted from the current position of electric vehicle 3, the rate of power consumption of electric vehicle 3, and the total capacity of battery packs 2 mounted on electric vehicle 3. When the determination is made that the capacity shortage occurs, notification unit 114 notifies mobile terminal device 6 held by the person in charge of the battery of a battery replacement instruction including an identification number and position information on electric vehicle 3 in which the capacity shortage occurs. For example, the notification is made by e-mail or short message service (SMS). When receiving the instruction through mobile terminal device 6, the person in charge of the battery goes to electric vehicle 3 with spare battery pack 2, and replaces battery pack 2 having insufficient capacity with battery pack 2 carried by the person in charge.

Upon receiving the abnormality signal indicating the abnormality of battery pack 2, notification unit 114 of monitoring device 1 notifies mobile terminal device 6 held by the person in charge of the battery of a battery replacement instruction including the identification number and the position information on electric vehicle 3 in which the battery abnormality occurs. When receiving the instruction through mobile terminal device 6, the person in charge of the battery goes to electric vehicle 3 with spare battery pack 2, and replaces battery pack 2 in which the abnormality occurs with normal spare battery pack 2 brought by the person in charge.

When the round ends, the user stops electric vehicle 3 at a parking position, and takes out battery pack 2 from battery mounting part 35. When receiving the identification number of taken-out battery pack 2 and the identification number of electric vehicle 3 from wireless terminal device 36 of electric vehicle 3 from which battery pack 2 has been taken out, acquisition unit 111 of monitoring device 1 cancels the registration of corresponding battery pack 2, electric vehicle 3, and user ID held in battery-vehicle-user association table 125.

The user goes to battery pack storage device 4 with taken-out battery pack 2, and mounts battery pack 2 to an empty mounting slot. Used battery pack 2 may be mounted to battery pack storage device 4 by an employee of the golf course.

When the user returns the score card to a person in charge of reception of the golf course, the person in charge of reception inputs the user ID and the score information through operation unit 54 of terminal device 5. Processor 51 of terminal device 5 then transmits the input user ID and score information to monitoring device 1. Acquisition unit 111 of monitoring device 1 updates the score information on the user in user information holder 122 based on the user ID and the score information received from terminal device 5 (S19). At that moment, history information regarding travel of electric vehicle 3 of the user may be stored in user information holder 122. For example, travel distance information on electric vehicle 3 is stored. The travel distance information may be acquired by measurement made by vehicle controller 31 of electric vehicle 3, or estimation based on the transition of the position information on electric vehicle 3 on the side of monitoring device 1. In a case where plural users has shot the round, history information regarding travel of a user with lowest skilled among the users is stored.

The stored travel distance information may be used when prediction unit 112 predicts the amount of power consumption of electric vehicle 3 in step S16. For example, prediction unit 112 corrects the score information on each user based on the average value of the past travel distances of electric vehicle 3 of each user. When the past average travel distance of a target user is longer than a reference value using the average travel distance of the user having the same score as the reference value, the score value of the user is multiplied by a coefficient exceeding 1 (one). On the contrary, when the past average travel distance of the target user is shorter than the reference value, the score value of the user is multiplied by a coefficient less than 1. The coefficient is determined in accordance with a deviation from the reference value. As described above, a lower-skilled user tends to have a longer travel distance while a higher-skilled user tends to have a shorter travel distance. However, even the same-skilled users may have individual differences in travel distance. Therefore, the individual difference is reflected in the output of the power consumption prediction model by correcting the score information given as a parameter to the power consumption prediction model with the stored travel distance information. This configuration enhances the prediction accuracy of the amount of power consumption of the electric vehicle used by the user.

Learning unit 115 of monitoring device 1 updates the power consumption prediction model by machine learning based on the amount of power consumption of electric vehicle 3 actually consumed in the round as teacher data (step S20).

As described above, according to the present exemplary embodiment, the capacities of battery packs 2 to be mounted on electric vehicle 3 are determined based on the amount of power consumption of electric vehicle 3 predicted in consideration of at least one of the number of users and their skills. This configuration optimizes a combination of battery packs 2 to be mounted on electric vehicle 3 while maintaining the convenience of the user, and reduces the degradation of battery packs 2 and prolong the life of whole battery packs 2 in the golf course.

In the case that the travel distance of electric vehicle 3 is predicted to be short for a high-skilled user, the number of battery packs 2 to be mounted on electric vehicle 3 may be reduced, thus enabling efficient operation of battery pack 2. In addition, selection of a combination of battery packs 2 having close characteristics reduces the occurrence of cross current between battery packs 2.

Further, in a case where a reservation is made in advance, charging of capacities more than necessary is not performed. This reduces storage degradation of battery packs 2 and electricity expense for charging.

The present disclosure has been described above based on the exemplary embodiment. It will be understood by the person of ordinary skill in the art that the exemplary embodiment is merely an example, other modified examples in which components and processing processes of the exemplary embodiment are variously combined are possible, and the other exemplary modifications still fall within the scope of the present disclosure.

The above exemplary embodiment has described an example in which the state information on battery packs 2 and the position information on electric vehicle 3 are transmitted from wireless terminal device 36 of electric vehicle 3 to monitoring device 1 in real time or periodically. In this regard, the state information on battery packs 2 and the position information on electric vehicle 3 may be stored in recording unit 362 of wireless terminal device 36 as chronological data. After the end of the round, processor 361 of wireless terminal device 36 may transmit the chronological data stored in recording unit 362 to monitoring device 1 by batch processing.

The above exemplary embodiment has described an example in which monitoring device 1 issues a charging command to battery pack storage device 4, and battery pack storage device 4 charges battery packs 2 at a current rate as low as possible based on the received charging command. In this regard, monitoring device 1 may create a charging pattern according to the degradation state of battery packs 2 and transmit the charging command to the battery pack storage device. In this case, monitoring device 1 acquires the identification information on battery pack 2 to be charged from battery pack storage device 4, and creates the charging pattern according to the SOH of corresponding battery pack 2 held in battery information holder 121. Monitoring device 1 transmits the charging command to battery pack storage device 4 based on the created charging pattern. Battery pack storage device 4 charges battery pack 2 based on the received charge command. Monitoring device 1 may acquire the state information on battery pack 2 during or after charging, and update the battery information on corresponding battery pack 2 held in battery information holder 121.

The above-described exemplary embodiment has described an example of using battery packs 2 incorporating battery module 21 including the lithium ion battery cell, the nickel hydrogen battery cell, the lead battery cell, or the like. In this regard, a capacitor pack incorporating a capacitor module including an electric double layer capacitor cell, a lithium ion capacitor cell, or the like may be used. In this specification, the battery pack and the capacitor pack are collectively referred to as a power storage pack.

Furthermore, the above exemplary embodiment has described an example in which low-speed electric vehicle 3 is used as a golf cart. In this respect, electric vehicle 3 may be used as a land car used in a shopping mall, an entertainment facility, or the like. In this case, instead of the user's skill, user's past travel history information (for example, an average travel distance) is used as a parameter to predict the amount of power consumption of electric vehicle 3 used by the user. In addition, the amount of power consumption of electric vehicle 3 used by the user may be predicted in consideration of attribute information such as gender and age of the user.

The exemplary embodiment may be specified by the following items.

Item 1

A monitoring device (1) is configured to communicate with a storage device (4) configured to store plural power storage packs (2) to be mounted on an electric vehicle (3) traveling at a low speed in a predetermined area. The monitoring device includes an acquisition unit (111), a prediction unit (112), and a selecting unit (113). The acquisition unit (111) is configured to acquire parameter information including information of a user who uses electric vehicle (3) and state information of the plural power storage packs (2) stored in storage device (4). The prediction unit (112) is configured to predict an amount of power consumption of electric vehicle (3) used by the user, based on the acquired parameter information. The selecting unit (113) is configured to select a combination of power storage packs (2) to be mounted on the electric vehicle (3) among the plural ty of power storage packs (2), based on the predicted amount of power consumption and the acquired state information of the plural power storage packs (2).

In this configuration, the optimum combination of the plurality of power storage packs (2) to be mounted on electric vehicle (3) can be determined by considering the information on the user who uses electric vehicle (3).

Item 2

Ion the monitoring device (1) according to item 1, the electric vehicle (3) is used for travel of a user who participates in a predetermined activity in the area. The parameter information includes at least one of information indicating a skill of the user and the number of users riding on the electric vehicle (3).

This configuration determines an optimum combination of the plural power storage packs (2) to be mounted on the electric vehicle (3) by considering at least one of the skill of the user who uses electric vehicle (3) and the number of the users.

Item 3

In the monitoring device (1) according to item 2, the parameter information further includes at least one of geographical information and weather information of the area.

This configuration allows the amount of power consumption of the electric vehicle (3) to be precisely predicted.

Item 4

In the monitoring device (1) according to item 2, in the case that plural users ride on electric vehicle (3), the prediction unit (112) is configured to predict the amount of power consumption of electric vehicle (3) based on information indicating a skill of a user with lowest skill in the activity among the plural users.

This configuration allows the amount of power consumption of the electric vehicle (3) to be predicted reflecting an estimated travel distance of the user with the lowest skill.

Item 5

In the monitoring device (1) according to item 2, the prediction unit (112) is configured to predict the amount of power consumption of the electric vehicle (3) based on history information regarding travel of the electric vehicle (3) by the user in addition to the information indicating the skill of the user who rides on the electric vehicle (3).

This configuration reflects individual differences regarding the travel of the electric vehicle (3) of the user as well as the skill of the user in the prediction.

Item 6

In the monitoring device (1) according to item 1, the plural power storage packs (2) are connected in parallel to one another and mounted on the electric vehicle (3). The selecting unit (113) is configured to select a combination of power storage packs (2) having a smallest number of parallel-connected power storage packs among combinations of the plural power storage packs (2) each having a capacity larger than or equal to an amount of electricity obtained by adding a margin to the amount of power consumption of the electric vehicle (3) predicted by the prediction unit (112).

This configuration reduces the total weight of power storage packs (2) to be mounted on the electric vehicle (3).

Item 7

In the monitoring device (1) according to item 1, the plural power storage packs (2) are connected in parallel to one another and mounted on the electric vehicle (3). The selecting unit (113) is configured to select a combination of power storage packs (2) having a smallest degradation variation among combinations of the plural power storage packs (2) each satisfying a capacity larger than or equal to an amount of electricity obtained by adding a margin to the amount of power consumption of the electric vehicle (3) predicted by the prediction unit (112).

This configuration reduces a cross current between the power storage packs (2).

Item 8

The monitoring device (1) according to item 1 may further include a notification unit (114) configured to notify storage device (4) of information indicating the combination of the power storage packs (2) specified by selecting unit (113) among the plural power storage packs (2) stored in storage device (4).

This configuration enables storage device (4) to indicate power storage pack (2) to be taken out by the user.

Item 9

The monitoring device (1) according to item 1 may further include a determination unit (116), and a notification unit (114). The determination unit (116) is configured to determine whether or not a capacity shortage occurs in the electric vehicle (3), based on the state information of the power storage packs (2) mounted on the electric vehicle (3) and the position information of the electric vehicle (3) acquired by the acquisition unit (111). The notification unit (114) is configured to notify the mobile terminal device (6) held by a person in charge that a capacity shortage occurs in the electric vehicle (3) when the determination unit (116) determines that the capacity shortage occurs in the electric vehicle (3).

This configuration enables the person in charge to go to the electric vehicle (3) and replace the power storage pack (2), thus preventing stop in advance due to insufficient capacity during use of the electric vehicle (3).

Item 10

The monitoring device (1) according to item 1 may further include a notification unit (114) configured to notify the mobile terminal device (6) held by a person in charge that an abnormality has occurred in the power storage pack (2) mounted on the electric vehicle (3) when an abnormality signal of the power storage pack (2) is acquired from the electric vehicle (3).

This configuration enables the person in charge to go to the electric vehicle (3) and replace the power storage pack (2) and to collect the power storage pack (2) in which the abnormality has occurred.

Item 11

The monitoring device (1) according to item 1 may further include a recording unit (12) and a learning unit (115). The recording unit (12) is configured to store the information of the user and the information of the power storage packs (2). The learning unit (115) is configure to generate a prediction model for predicting the amount of power consumption of the electric vehicle (3). The learning unit (115) is configured to update the prediction model based on a difference between the amount of power consumption of the electric vehicle (3) predicted by prediction unit (112) and an actual amount of power consumption of the vehicle.

This configuration improves the prediction accuracy of the amount of power consumption of the electric vehicle (3).

Item 12

A management system (100) includes an electric vehicle (3) equipped with plural power storage packs (2) and travels at a low speed in a predetermined area, a storage device (4) storing the plural power storage packs (2) to be mounted on the electric vehicle (3), and a monitoring device (1) configured to communicate with the electric vehicle (3) and the storage device (4). The monitoring device (1) includes an acquisition unit (111), a prediction unit (112), and a selecting unit (113). The acquisition unit (111) is configured to acquire parameter information including information of a user who uses the electric vehicle (3) and state information of the plural power storage packs (2) stored in the storage device (4). The prediction unit (112) is configured to predict an amount of power consumption of the electric vehicle (3) used by the user, based on the acquired parameter information. The selecting unit (113) is configured to select a combination of power storage packs (2) to be mounted on electric vehicle (3) among the plural power storage packs (2), based on the predicted amount of power consumption and the acquired state information of the plural power storage packs (2).

This configuration provides an optimum combination of the plural power storage packs (2) to be mounted on the electric vehicle (3) can be determined by considering the information of the user who uses the electric vehicle (3).

Item 13

In the management system (100) according to item 12, the electric vehicle (3) is used for travel of a user who participates in a predetermined activity in the area. The parameter information includes at least one of information indicating a skill of the user and the number of users riding on the electric vehicle (3).

In this configuration, it may be determined an optimum combination of the plural power storage packs (2) to be mounted on the electric vehicle (3) by considering at least one of the skill of the user who uses the electric vehicle (3) and the number of the users.

Item 14

A management method for managing plural power storage packs (2) to be mounted on an electric vehicle (3) traveling at a low speed in a predetermined area is provided. The management method includes:
- acquiring parameter information including information of a user who uses the electric vehicle (3) and state information of the plural power storage packs (2) stored in a storage device (4) for storing the plural power storage packs (2) to be mounted on the electric vehicle (3);
- predicting an amount of power consumption of the electric vehicle (3) used by the user based on the acquired parameter information; and
- selecting a combination of power storage packs (2) to be mounted on the electric vehicle (3) among the plural power storage packs (2), based on the predicted amount of power consumption and the acquired state information of the plural power storage packs (2).

In this configuration, the optimum combination of the power storage packs (2) to be mounted on the electric vehicle (3) is determined by considering the information on the user who uses the electric vehicle (3).

Item 15

In the management method according to item 14, the electric vehicle (3) is used for travel of a user who participates in a predetermined activity in the area. The parameter information includes at least one of information indicating a skill of the user and the number of users riding on the electric vehicle (3).

In this configuration, an optimum combination of the plurality of power storage packs (2) to be mounted on electric vehicle (3) is determined by considering at least one of the skill of the user who uses the electric vehicle (3) and the number of the users.

REFERENCE MARKS IN THE DRAWINGS 100 management system
200 network
300 commercial power system
400 weather forecast information server
1 monitoring device
11 processor
12 recording unit
121 battery information holder
122 user information holder
123 reservation information holder
124 golf course map information holder
125 battery-vehicle-user association table
111 acquisition unit
112 prediction unit
113 selecting unit
114 notification unit
115 learning unit
116 determination unit
2 battery pack
21 battery module
E1-En cell
22 control board
23 voltage measurement unit
24 temperature measurement unit
25 current measurement unit
26 controller
T1 temperature sensor
3 electric vehicle
31 vehicle controller
32 inverter
33 motor
34 transmission
35 battery mounting part
36 wireless terminal device
361 processor
362 recording unit
363 display unit
364 operation unit
365 antenna
366 GPS receiver
4 battery pack storage device
40 control device
41 processor
42 recording unit
43 display unit
44 operation unit
45 sound output unit
46 charging stand
47 charger
5 terminal device
51 processor
52 recording unit
53 display unit
54 operation unit
6 mobile terminal device
61 processor
62 recording unit
63 display unit
64 operation unit
65 antenna
66 GPS receiver

The invention claimed is:

1. A monitoring device configured to communicate with a storage device that stores a plurality of power storage packs configured to be mounted on an electric vehicle traveling at a low speed in a predetermined area, the monitoring device comprising:
   an acquisition unit configured to acquire parameter information including information on a user who uses the electric vehicle and state information of the plurality of power storage packs stored in the storage device;
   a prediction unit configured to predicts an amount of power consumption of the electronic vehicle used by the user, based on the acquired parameter information; and
   a selecting unit configured to select a combination of power storage packs to be mounted on the electric vehicle among the plurality of power storage packs, based on the predicted amount of power consumption and the acquired state information on the plurality of power storage packs, wherein
   the electric vehicle is used for travel of a user who participates in a predetermined activity, aside from driving the electric vehicle, in the predetermined area, and
   the parameter information includes information indicating a skill of the user in the predetermined activity.

2. The monitoring device according to claim 1, wherein the parameter information further includes information indicating a number of users riding the electric vehicle.

3. The monitoring device according to claim 2, wherein the parameter information further includes at least one of geographical information of the predetermined area and weather information in the predetermined area.

4. The monitoring device according to claim 2, wherein, in a case that a plurality of users ride the electric vehicle, the prediction unit is configured to predict the amount of power consumption of the electric vehicle based on information indicating a skill of a user with a lowest skill of the predetermined activity among the plurality of the users.

5. The monitoring device according to claim 2, wherein the prediction unit is configured to predict the amount of power consumption of the electric vehicle based on history information of travel of the electric vehicle by the user in addition to the information indicating the skill of the user riding the electric vehicle.

6. The monitoring device according to claim 1, wherein
the plurality of power storage packs are connected in parallel to one another and mounted on the electric vehicle, and
the selecting unit is configured to select a combination of power storage packs with a smallest number of power storage packs connected parallel to one another among combinations of the plurality of power storage packs with a capacity larger than or equal to an amount of electricity obtained by adding a margin to the amount of power consumption of the electric vehicle predicted by the prediction unit.

7. The monitoring device according to claim 1, wherein
the plurality of power storage packs are connected in parallel to one another and mounted on the electric vehicle, and
the selecting unit is configured to select a combination of power storage packs with a smallest degradation variation among combinations of the plurality of power storage packs satisfying a capacity larger than or equal to an amount of electricity obtained by adding a margin to the amount of power consumption of the electric vehicle predicted by the prediction unit.

8. The monitoring device according to claim 1, further comprising a notification unit configured to notify the storage device of information indicating the combination of the power storage packs specified by the selecting unit among the plurality of power storage packs stored in the storage device.

9. The monitoring device according to claim 1, further comprising:
a determination unit configured to determine whether a capacity shortage occurs in the electric vehicle, based on the state information of the power storage packs mounted on the electric vehicle and position information of the electric vehicle acquired by the acquisition unit; and
a notification unit configured to notify a mobile terminal device held by a person in charge that a capacity shortage occurs in the electric vehicle when the determination unit determines that the capacity shortage occurs in the electric vehicle.

10. The monitoring device according to claim 1, further comprising a notification unit configured to notify a mobile terminal device held by a person in charge that an abnormality has occurred in a power storage pack mounted on the electric vehicle when acquiring an abnormality signal of the power storage pack from the electric vehicle.

11. The monitoring device according to claim 1, further comprising:
a recording unit configured to store information of the user and information of the plurality of power storage packs; and
a learning unit configured to generate a prediction model for predicting the amount of power consumption of the electric vehicle, wherein
the learning unit is configured to update the prediction model based on a difference between the amount of power consumption of the electric vehicle predicted by the prediction unit and an actual amount of power consumption of the electronic vehicle.

12. A management system comprising:
an electric vehicle configured to have a plurality of power storage packs mounted thereon and travel at a low speed in a predetermined area;
a storage device stores the plurality of power storage packs to be mounted on the electric vehicle; and
a monitoring device configured to communicate with the electric vehicle and the storage device, wherein
the monitoring device includes:
an acquisition unit configured to acquire parameter information including information of a user who uses the electric vehicle and state information of the plurality of power storage packs stored in the storage device,
a prediction unit configured to predict an amount of power consumption of the electric vehicle used by the user, based on the acquired parameter information, and
a selecting unit configured to select a combination of power storage packs to be mounted on the electric vehicle among the plurality of power storage packs, based on the predicted amount of power consumption and the acquired state information of the plurality of power storage packs,
the electric vehicle is used for travel of a user who participates in a predetermined activity, aside from driving the electric vehicle, in the predetermined area, and
the parameter information includes information indicating a skill of the user in the predetermined activity.

13. The management system according to claim 12, wherein
the parameter information further includes information indicating a number of users riding on the electric vehicle.

14. A management method for managing a plurality of power storage packs to be mounted on an electric vehicle traveling at a low speed in a predetermined area, the management method comprising:
acquiring parameter information including information of a user who uses the electric vehicle and state information of the plurality of power storage packs stored in a storage device for storing the plurality of power storage packs to be mounted on the electric vehicle;
predicting an amount of power consumption of the electric vehicle used by the user based on the acquired parameter information; and
selecting a combination of power storage packs to be mounted on the electric vehicle among the plurality of power storage packs, based on the predicted amount of power consumption and the acquired state information on the plurality of power storage packs, wherein the electric vehicle is used for travel of a user who participates in a predetermined activity, aside from driving the electric vehicle, in the predetermined area, and the parameter information includes information indicating a skill of the user in the predetermined activity.

15. The management method according to claim 14, wherein the parameter information further includes information indicating a number of users riding on the electric vehicle.

16. The monitoring device according to claim 1, wherein the predetermined activity is golf.

17. The management system according to claim 12, wherein the predetermined activity is golf.

18. The management method according to claim 14, wherein the predetermined activity is golf.

* * * * *